United States Patent [19]

Farmer

[11] Patent Number: 4,832,168

[45] Date of Patent: May 23, 1989

[54] FLUID OPERATED TRANSPORT DEVICE, AND METHOD

[75] Inventor: David K. Farmer, Niles, Ill.

[73] Assignee: Cargo Walker, Inc., Minneapolis, Minn.

[21] Appl. No.: 108,109

[22] Filed: Oct. 13, 1987

[51] Int. Cl.$^4$ ............................................. B65G 25/00
[52] U.S. Cl. .................................. 198/300; 198/777; 180/7.1; 180/8.1; 180/8.6
[58] Field of Search ............... 198/630, 773, 777, 300; 180/7.1, 8.1, 8.5, 8.6

[56] References Cited

U.S. PATENT DOCUMENTS

| | | |
|---|---|---|
| 3,327,832 | 6/1967 | Kyle . |
| 3,537,540 | 11/1970 | Zuppiger et al. . |
| 3,543,907 | 12/1970 | Pool et al. . |
| 3,576,225 | 4/1971 | Chambers ............................ 180/8.5 |
| 3,693,740 | 9/1972 | Lewis et al. . |
| 3,831,691 | 8/1974 | Jenkins . |
| 3,871,534 | 3/1975 | Bursk ................................. 414/525 |
| 3,942,627 | 3/1976 | Guigan . |
| 3,985,064 | 10/1976 | Johnson . |
| 4,227,608 | 10/1980 | Alfthan et al. . |

FOREIGN PATENT DOCUMENTS 2444537  4/1976  Fed. Rep. of Germany ...... 198/777

Primary Examiner—Robert J. Spar
Assistant Examiner—James R. Bidwell
Attorney, Agent, or Firm—Merchant, Gould, Smith, Edell, Welter & Schmidt

[57] ABSTRACT

A cargo handling device is provided. In a preferred embodiment, the device comprises a substrate having at least one motivation mechanism mounted thereon. In other embodiments, the substrate may include more than one motivation mechanism. The motivation mechanism comprises a plurality of pairs of oppositely directed foot members; each pair of foot members comprising a first hinged member and a second hinged member. The first hinged member of each pair is selectively actuatable independently of the second member of each pair of foot members. Each hinged member generally comprises a hinge-shaped member having one hinged side mounted to the substrate and the other hinged side movable with respect thereto. For the preferred embodiment movement is generated by means of fluid bladder positioned between the two hinge member sides. When operated according to a preferred sequence, the device may be utilized in a first mode to move a substrate across a surface, such as a warehouse floor or a truck bed. When operated according to a second mode, with the foot members directed upwardly and against the under side of cargo, the cargo may be selectively moved according to a selected path. In one embodiment, a preferred foot member shape is described, to facilitate lateral movement.

19 Claims, 4 Drawing Sheets

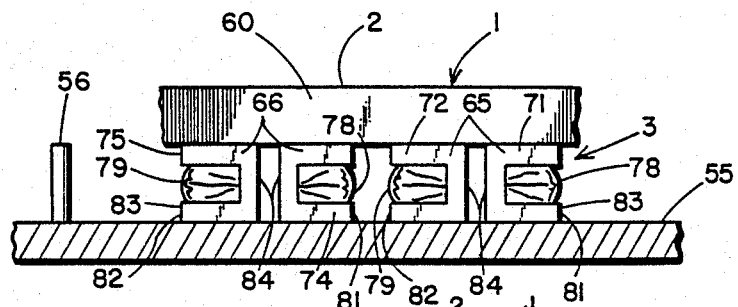
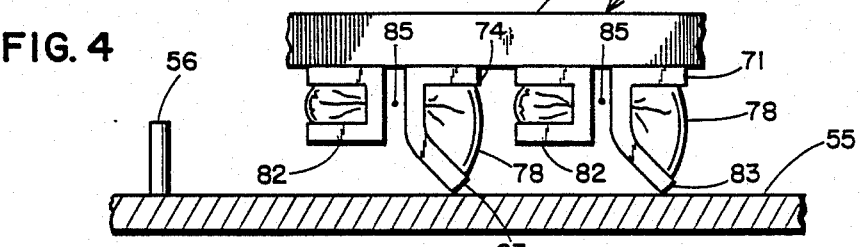
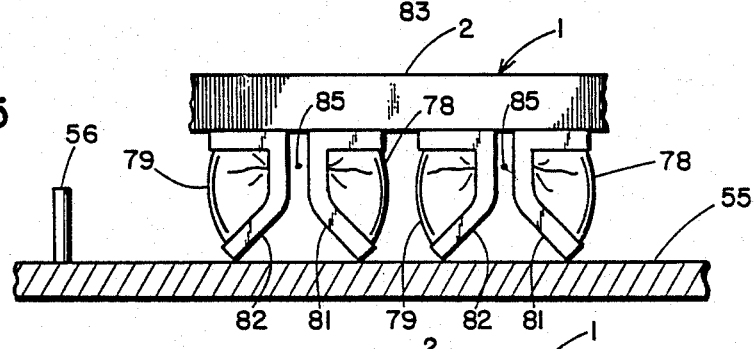
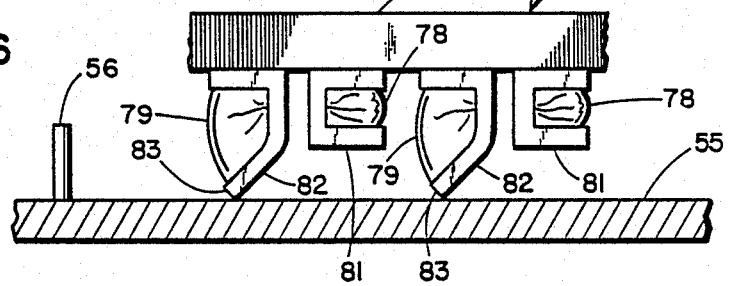
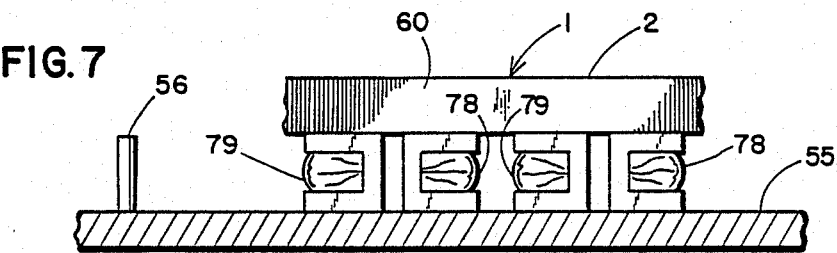

FLUID OPERATED TRANSPORT DEVICE, AND METHOD

FIELD OF THE INVENTION

The present invention relates to cargo handling devices, and in particular to devices for the transport of cargo, for example across surfaces such as warehouse floors, truckbeds or the like. More specifically, the invention concerns devices wherein expansion or contraction of various elements, by fluid pressure, generates preferred cargo movement.

BACKGROUND OF THE INVENTION

Numerous systems have been developed for the handling of cargo materials, such as crated or boxed items. Devices for the handling of such materials are particularly necessary at warehouses and at loading and unloading docks; whereat large volumes of cargo may be involved.

One widely used method of cargo handling is through the utilization of hand trucks, forklifts, and similar trolley arrangements. While such devices have their uses and advantages, they are not particularly effective for use when it is necessary to move large numbers or volumes of boxes, crates and the like along a repeated path. For example, the movement of 1,000 crates across a single path, into a railroad car, would generally require 1,000 trips with a hand truck or forklift, or at least a plurality of such trips if more than one crate could be handled at a time.

Further, such hand trucks and forklifts may require physically demanding loading and unloading operations for their own use, or at least a proper stacking of the material on a pallet or the like. Also, their use may be hampered when operating space is limited, or when environmental conditions are inclement.

Conveyor systems are often utilized when movement of materials along a repeated path is desired. While such devices certainly have their uses and benefits, they are limited due to numerous drawbacks, outlined below. The term "conveyor" when used with respect to these devices is generally meant to refer to conventional roller conveyors, belt conveyors and the like, on which boxes, baggage or other materials are typically transported along a moving or rotating surface.

Problems with such arrangements include that they are relatively complicated to set up, and are usually somewhat permanent in their positioning. That is, a single path can be readily defined by such devices; however, the path cannot generally be readily changed without substantial disassembly and reassembly steps. Further, operation of many such assemblies requires a construction such that the upper or transport surface of the device is raised considerably, in relief, from the warehouse floor or other surface involved. A problem with this is that the cargo must be lifted onto such surfaces, which can require considerable energy and/or special handling equipment.

Further, such devices are not particularly well-adapted for the transport of material into and out of trucks, railroad cars or the like. A reason for this is that such conveyors often terminate at the end of the loading dock, and do not operate effectively to move the cargo completely into, or out of, the enclosed spaces represented by the truck, trailer or other vehicle.

Another problem with such devices is that they often are very complicated, and subject to breakdown at any of numerous points therealong. That is, failure of a roller, bearing or the like can sometimes jam-up or stop the entire system.

What has been needed has been a system usable to convey materials such as crates or the like over a surface such as a warehouse floor; and, further, a system wherein the material can be readily transported into a truck bed, railroad car or the like. Further, what has been needed is such a system which is at least capable of relatively low relief, so that material can be readily loaded onto, or off-loaded from, such a device. preferably the system is such that it is readily adaptable to a variety of warehouse arrangements, and is easily oriented for movement of cargo along a variety of paths. Further, it is preferred that such a system be capable of handling an entire bed load of cargo at once, without the need for handling of items individually, if possible.

OBJECTS OF THE INVENTION

Therefore, the objects of the present invention are: to provide a system capable of lining a truck bed or the like, with cargo material stacked thereon, and further capable of moving the cargo, as a unit, into or out of the truck bed; to provide such a system adaptable to provide a conveyor surface across a warehouse floor or the like; to provide such a system capable of having a relatively low relief to facilitate loading cargo thereon, or off-loading of cargo therefrom; to provide such a system operable by means of fluid pressure, such as air pressure; to provide a preferred such system comprising a substrate having a plurality of pairs of adjustable foot portions or members thereon, the foot members being oriented to cause movement of the substrate; to provide a preferred system comprising a substrate having a plurality of pairs of upwardly directed foot members, and a plurality of pairs of downwardly directed foot members, the downwardly directed foot members being operable to move the substrate across a floor or truck bed surface, or the like, and the upwardly directed pairs of foot members being operable to selectively move cargo thereover; to provide an alternate preferred system comprising a substrate having only a plurality of pairs of upwardly directed foot members thereon operable to selectively move cargo thereover; to provide a cargo handling system operable by means of a plurality of pairs of foot members, each comprising an elongate front hinged foot member and an elongate rear hinged foot member, selectively operable under fluid pressure to generate movement according to a selected pattern; to provide a preferred such arrangement wherein each front hinged member is substantially similar to, but mounted substantially as a mirror image of, each rear hinged member; and, to provide such an arrangement which is relatively easy to manufacture, assemble and use, and which is particularly well-adapted for the proposed usages thereof.

Other objects, advantages and advantageous embodiments will become and uses apparent form the following descriptions, taken in connection with the accompanying drawings, therein are set forth by way of illustration and example certain embodiments of the present invention.

SUMMARY OF THE INVENTION

According to the present invention, a substrate is provided with a motive mechanism comprising a plurality of pairs of movable feet or foot members. A variety of embodiments are feasible, preferred ones of which basically utilize pairs of movable foot members in substantially analogous manners. In one embodiment, the substrate includes a mounting surface with the plurality of pairs of foot members mounted thereon. Once cargo is loaded onto the device, selective operation of the pairs of foot members generates movement of the substrate, and cargo, in a selected manner. It will be understood that if the substrate were sized to fit within and completely cover a truck bed, an entire truckload of cargo could be moved as a single unit. A control mechanism provides for selective actuation and operation of the system.

If an alternate mode of operation of the invention, the substrate is oriented with a plurality of foot members directed upwardly, and with the cargo resting thereon. For such an embodiment, the cargo can be moved relative to the substrate, through operation of the pairs of foot members. That is, the substrate is maintained stationary, while the cargo is moved thereacross. Such an embodiment might be used, for example, to replace utilization of a conventional conveyor for movement of cargo along a defined path, for example to and from a loading dock, or into and out of an airplane hold.

In yet another embodiment of the present invention, a substrate is provided with operable pairs of foot members on opposite mounting surfaces. Such an embodiment may be operated in a variety of modes including to move the entire substrate across a surface, with cargo mounted thereon, or to move the cargo independently of the substrate. Loading and unloading of such an arrangement is particularly convenient, since the upper foot members can be utilized, in coordination with the lower foot members, to allow the substrate to crawl out from underneath, or alternatively to crawl under, a load of cargo.

The present invention particularly concerns the nature and cooperation of the foot members, or pairs of foot members, useable in association with a substrate, for example as above described. Each pair of foot members is capable of selectively generating movement either forward or backward, depending upon the sequence of operation. When mounted as a plurality of pairs, for example underneath a substrate, the plurality of pairs of foot members can be operated in cooperation to selectively generate forward or reverse movement. This will be understood from reference to the detailed description below.

Each pair of foot members preferably comprises first and second hinged members, oriented generally oppositely of one another and sometimes referred to herein as front and rear hinged members. Preferably the first hinged member and second hinged member are mounted as mirror images of one another.

For the preferred embodiment, each hinged member is selectively expandable, by means of applied fluid pressure, to generate both vertical and lateral movement. The fluid pressure can be selectively provided by a variety of mechanisms, including through use of conventional pump and valve arrangements. The fluid pressure may be applied as a gas pressure, for example air pressure, or as a liquid pressure, for example a water or oil pressure. Generally, a bladder means or mechanism associated with the hinged members facilitates the movement.

From the detailed descriptions, operation of the system will be readily understood. Generally, to move a substrate in the forward direction, a set of forwardly directed hinged members is actuated to both lift the substrate and move same forwardly. The lifting of the substrate simultaneously lifts all rearwardly directed hinged members up from the floor surface. At maximum vertical extension, the rearwardly directed hinged members are all sequentially lowered. Following this, the frontwardly directed hinged members are all simultaneously lifted, i.e. collapsed, raising same above the floor and against the substrate. At this point, the substrate is supported in a raised position by the rearwardly directed foot members. A collapsing of the rearwardly directed foot members then lowers the substrate, with movement of same in the forward direction. Operation by the control mechanism to move the substrate in a reverse manner is accomplished by a reverse sequencing. That is, it is the rearwardly directed hinged members which are first actuated, followed by: actuation of the frontwardly directed hinged members; collapse of the rearwardly directed hinged members; and, finally, collapse of the frontwardly directed hinged members.

If the cargo load is not symmetrically positioned on the substrate, the substrate may tend to deviate from movement in a straight line. This can be readily corrected through use of stationary side rails, curbs or guides positioned along an edge, or edges, or the assembly.

A variety of shapes of foot members can be utilized, according to the present invention. Two preferred embodiments are disclosed both of which include the use of hinged members. In one, each foot member is shaped, in cross section, approximately as a block C, one side of which is mounted on the substrate and another or second side of which is movable during expansion and collapse to generate both forward and vertical movement. For the preferred form of this embodiment, the second side of each hinged member is an elongate flat strip having an outer or toe-edge, and an inner or heel-edge. During actuation to lift cargo, the hinged member rocks up onto the toe-edge.

In an alternate embodiment, a lower extension or pad of each foot is curved substantially, to accentuate linear movement during vertical lift. Th first (block C) arrangement is particularly simple in design and relatively easy to effect. The second (curved) arrangement causes a greater efficiency of operation by allowing for an increase in the ratio of lateral movement and lift.

Generally, for the preferred embodiments described and shown, the individual front and rear foot members of each pair are elongate, and may be viewed as oriented in opposite directions from a central, imaginary, virtual hinge line. As a result, each foot member resembles an elongate hinge, expandable and collapsible through utilization of a fluid filled chamber or bladder. Such foot members are referred to herein as "hinged" members.

It will be understood that devices according to the present invention can find use in a variety of embodiments, and in a variety of applications. For example, such devices might be utilized to handle aircraft cargo, marine hauling, between deck ship loadings, railroad car applications, as float plane ramps, in warehouses, and in similar applications. In some arrangement, foot members may be mounted directly onto a large item to be moved. Some of the various embodiments will be referred to in more detail below.

The drawings constitute a part of this specification and include examplary embodiments of the present invention, while illustrating various objects and features thereof. It will be understood that in some instances relative component sizes, and material thicknesses, may be shown exaggerated for clarity.

BRIEF DESCRIPTION OF THE DRAWINGS

FIG. 3 is a fragmentary side elevational view depicting a device according to the embodiment of FIG. 1 in a neutral or rest position.

FIG. 4 is an enlarged fragmentary side elevational view of the embodiment depicted in FIG. 3, during a stage of operation with one set of foot members expanded, to both raise the device and laterally move same.

FIG. 5 is an enlarged fragmentary side elevational view of the embodiment shown in FIGS. 3 and 4, during a step or operation in which all foot members have been expanded, to support the device in an upper most position.

FIG. 6 is an enlarged fragmentary side elevational view of the embodiments shown in FIGS. 3, 4 and 5, during a step of operation in which a second set of foot members are expanded, and a first set of foot members is contracted.

FIG. 7 is an enlarged fragmentary side elevational view depicting a device according to the present invention and in a next step of operation following FIGS. 3, 4, 5 and 6 sequentially.

DETAILED DESCRIPTION OF THE PREFERRED AND ALTERNATE EMBODIMENTS

As required, detailed embodiments of the present invention are disclosed herein. However, it is to be understood that the disclosed embodiments are merely examplary of the invention which may be embodied in various forms. Therefore, specific structural and functional details disclosed herein are not to be interpreted as limiting, but rather as a basis for the claims and as a representative basis for teaching one skilled in the art to variously employ the present invention in virtually any appropriately detailed structure.

Figure 1:
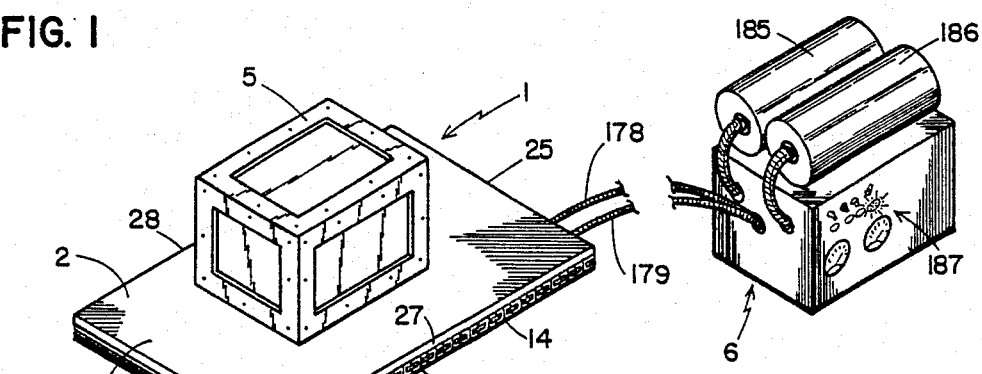
FIG. 1 is a fragmentary perspective view of a cargo handling device according to the present invention.

The reference numeral 1, FIG. 1, generally designates a cargo handling system or device 1 according to the present invention. The embodiment depicted in FIG. 1 comprises a device 1 having a substrate 2 with a motivation mechanism 3 associated therewith. Selective operation of the motivation mechanism 3 causes selected movement of substrate 2, for example across a warehouse floor, or into and out of a truck bed, cargo hold or the like. Detail concerning the motivation mechanism 3 will be provided below, and relates generally to the nature of the present invention. Referring generally to FIG. 1, the device 1 is depicted for movement of a large cargo container 5. It will be understood, however, that a variety of numbers, sizes, shapes, weights, etc. of cargos can be handled by device 1, the depiction of FIG. 1 being examplary only. The reference numeral 6 generally designates a control mechanism or apparatus for device 1. Operation and general characteristics of the control apparatus 6 will also be understood from the following detailed description.

Figure 2:
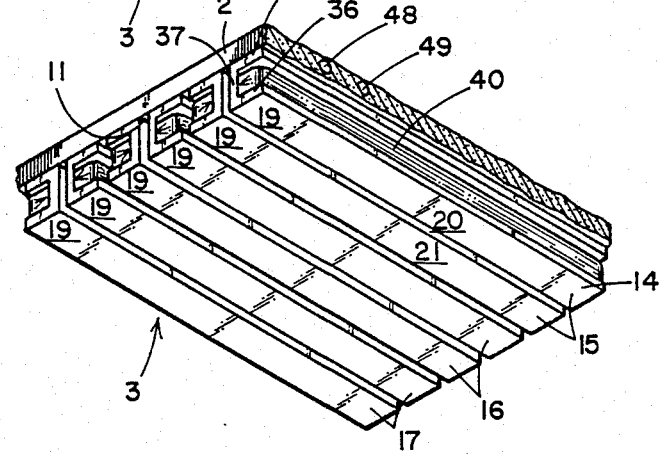
FIG. 2 is an enlarged fragmentary perspective view of a portion of the arrangement shown in FIG. 1.

Referring to FIGS. 1 and 2, substrate 2 for the preferred embodiment depicted has opposite mounting surfaces 10 and 11. For the embodiment of FIGS. 1 and 2, the motivation mechanism 3 is associated with one mounting surface 11 only. As shown, the motivation mechanism 3 can be operated to move the entire substrate 2, with the cargo 5 thereon.

Referring to FIG. 2, motivation mechanism 3 comprises a plurality of pairs 14 of foot members mounted on surface 11; in FIG. 2, three pair 15, 16 and 17 of foot members being viewable. Referring to FIG. 1, for the embodiment depicted side 11 of substrate 2 includes mounted thereon as many elongate pairs 14 of foot portions as are necessary to substantially completely cover side 11. Generally, the pairs 14 of aligned parallel to one another, so that they can be simultaneously operated to generate linear movement as described below.

Referring to FIG. 2, each pair 14 of foot members comprises individual first and second foot members, preferably hinged members 19. In FIG. 2, for example, pair 15 includes first hinged member 20 and second hinged member 21. For the preferred embodiments described as shown, the first and second hinged members 20 and 21, of each pair 14, are substantially identical to one another, but mounted substantially as mirror images. As a result, it will be understood from the below discussion of FIGS. 3-7 that the device 1 can be readily, and selectively, operated to generate either forward or rearward movement. For the embodiment depicted in FIG. 2, generally hinged member 20 will be referred to as a forward hinged member, and hinged member 21 as a rearward hinged member. However, it will be understood that the directional terms "forward" and "rearward" are utilized for reference purposes only and not to indicate any absolute orientation of alignment.

Referring to FIG. 1, correspondingly substrate 2 has a forward edge 25, a rearward edge 26 and opposite side edges 27 and 28.

Each member 19 is generally hinge-shaped, with one side member or extension of each hinged member mounted to a mounting surface of substrate 2 and the other side member of each hinged member being selectively movable relative to the substrate 2, to generate motion in a preferred manner. Referring to FIG. 2, for example, hinged member 20 has a general hinge shape with side member 35 mounted on substrate mounting surface 11, and with side 36 suspended therefrom. Sides 35 and 36 are attached to one another through transition portion 37.

In FIG. 2 each hinged member 19, including hinged member 20, is depicted in a collapsed, closed, or non-energized orientation. That is, for example, hinged member 20 is depicted with side 36 collapsed maximally toward side 35.

Each hinged member, for example hinged member 20, FIG. 2, includes bladder means, for example a bladder member 40, therein. The bladder member 40 is positioned between sides 35 and 36, and is selectively expandable. As bladder member 40 is expanded, side 36 is biased away from side 35 in a manner analogous to the opening of a hinge. Bladder member 40 may be operated, preferably, by means of internal fluid pressure increase and decrease, to generate expansion and contraction. A variety of fluids may be utilized, including gases and liquids. Typically air pressure will be used for preferred embodiments according to the present invention, as any resulting leakage of air would present little clean-up or damage problem. However, it will be understood that a variety of other gases, or a wide variety of liquids such as water and oils, may be utilized in embodiments of the present invention. For the preferred embodiment shown, fluid communication with the various bladders is provided through conduits 48 and 49, in a manner described below.

Operation of the device 1 will be understood by reference to FIGS. 3–7, as follows:

Referring to FIG. 3, device 1 is depicted on a warehouse floor 55. Post 56 provides a reference point in FIGS. 3–7, for both vertical and lateral mvoement. In FIG. 3, a fragmentary side elevational view of device 1 is shown. The substrate 2 is depicted supported above the warehouse floor 55 by means of the motivation mechanism 3. The substrate 2 may be of a variety of constructions, for example a large sheet of wood, plastic or the like. It will be understood that in some applications substrate 2 may itself be articulated, i.e. include hinge points or the like therein. Further, substrate 2 need not be rigid, but rather in some applications it may be flexible. One of the advantages of the present invention is that the motivation mechanism 3 can readily accommodate such modifications or variations in the substrate 2.

For purposes of reference only, in FIGS. 3–7, forward movement will be understood to mean movement away from post 56, and reverse movement or rearward movement will be understood to refer to movement in the direction of post 56. Thus, in advancing from FIGS. 3 through 7, device 1 is depicted moving in a forward direction.

The section 60 of substrate 2 depicted in FIG. 3 is shown having two pair 65 and 66 of hinged members or foot members thereon, although it will be understood that over a wider expanse substrate 2 may include many more pairs of foot members. The first pair 65 comprises a first or front hinged member 71 and a second or rear hinged member 72. Similarly, the second pair 66 comprises front and rear hinged members 74 and 75 respectively. Each of the front members 71 and 74 has a bladder mechanism 78. Likewise each of the rear members 72 and 75 has a rear bladder mechanism 79. The bladders 78 and 79 of the preferred embodiment shown are selectively expandable, as described below, to generate motion of the device 1. In FIG. 3, all bladders 78 and 79 are shown in a rest or collapsed position. Each hinged member 71, 72, 74 and 75, includes a side member, 81 and 82 movable by means of the bladder mechanism 78 and 79 respectively. Each side member 81 and 82 includes an outer or toe-edge 83, and an inner or heel edge 84. As described below, motion is generated by selective movement onto the outer or toe-edges 83. For the preferred embodiment shown, each bladder member 28 and 29 is an elongate tube positioned within an associated hinged member between hinge sides.

A first step of motion in the forward direction, i.e. away from post 56, is depicted in FIG. 4. For the first step, all forward bladders 78 are selectively expanded, preferably simultaneously. As a result, the substrate 2, and any cargo thereon, is lifted vertically, and is moved somewhat in a forward direction, i.e. to the right in FIG. 4, as the substrate rocks up onto toe-edges 83 of the forward hinged members 71 and 74. This motion is generated due to rotation of the lower expensions 81 of each hinged member 71 and 74 about imaginary, virtual, hinge lines 85.

In a second step of operation, after the front bladders 78 have been expanded to lift and move device 1, the rear bladders 79 are expanded, as shown in FIG. 5, to drop the lower extensions 82 of the rear foot members 72 and 75, into engagement with the warehouse floor 55. It will be understood that for the preferred embodiment in which the forward and rear hinged members are substantially mirror images of one another, lower extensions 82 pivot about substantially the same virtual hinge lines 85.

In FIG. 6, a third step in operation is depicted. During this step, front bladders 78 are collapsed, while rear bladders 79 are retained expanded. The result is that lower extensions 81 are lifted above the floor surface 55, leaving device 1 supported by only the lower extensions 82 of the rear hinged members, and raised along edges 83.

In a final step of the sequence, the rear bladders 79 are collapsed. As this occurs, the substrate 2 is moved downwardly and forwardly, i.e. to the right in FIGS. 6 and 7. It will be understood that a variety of valving arrangements in the control mechanism may be utilized to provide for fluid to various fluid lines for control of the bladders. Electronic timers and the like can be utilized to control operation.

In some instances variations in the warehouse floor, or imbalances in symmetry of weight loaded onto substrate 2, may encourage movement of device 1 along a path other than a straight line. Guide rails or curbs, not shown, could readily be positioned along one or both side edges 27 and 28, FIG. 1, to facilitate motion of device 1 along a preferred path.

It will be readily understood that alternatively to operation as described in FIGS. 3–7, device 1 can be operated with the motive mechanism 3, i.e. with all pairs 14 of foot members or portions, directed upwardly from the substrate 2, rather than downwardly therefrom. In such a manner, the motive mechanism 3 can be used to directly move the cargo, relative to the substrate. In particular, operation would be generally as described for FIGS. 3–7, however the foot members would be directed upwardly to engage the cargo, rather than the floor. The result is that the cargo would be moved therealong, in a defined path. That is the hinged members would push upwardly and laterally against the cargo, to move same.

Figure 11:
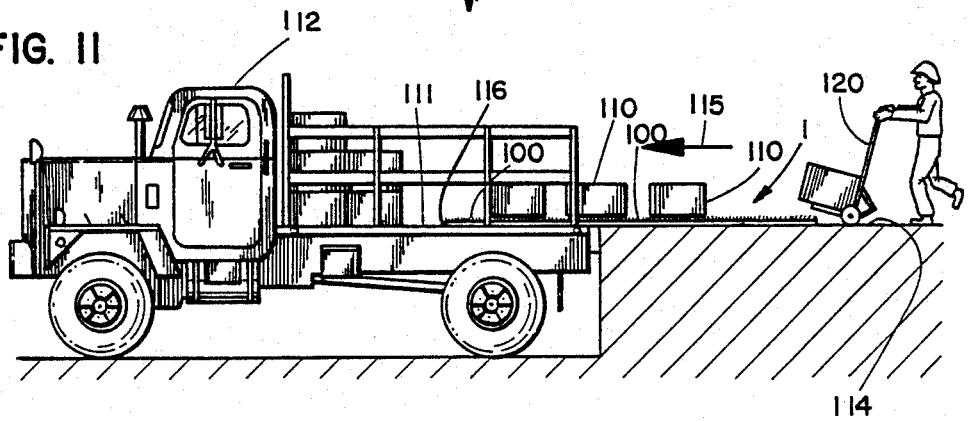
FIG. 11 is a side elevational view depicting use of a preferred embodiment of the present invention to load cargo or the like onto a truck bed.

An example of operation in this second mode of operation is illustrated in FIG. 11. In particular, device 1 is shown as having motive mechanism 100 directed generally upwardly. Device 1 is shown illustrated to load cargo 110 onto a bed 111 of a truck 112. Generally, the cargo 110 is shown being transported from loading dock 114 along a path, defined by the device 1, corresponding to movement in the direction of arrow 115 to end 116 of the device 1. A lightweight substrate for the device of FIG. 11 permits it to be readily positioned over bed 111. In the alternative, bed 111 and dock 114 can have separate devices thereon, brought into cooperative engagement as the truck 112 is backed up to the dock.

A particularly advantageous feature to devices according to the present invention is apparent from an examination of FIG. 11. In particular, loading onto the system is relatively easy, and can be accommodated by a hand truck 120 or the like. One reason for this is that the arrangement 1 has a relatively low profile, due to the simple arrangement of the pairs of foot members of the motive mechanism 100. Thus, the cargo 110 does not have to be substantially lifted, but rather can simply be lowered onto the device 1, from the truck 120. Further, only a forward edge of the cargo needs to be loaded onto the device 1, since the motive mechanism 100, i.e. the foot members of the device 1, can be operated to pull the cargo completely onto device 1. Also, due to the very low profile of device 1, a hand truck such as truck 120 can be easily pushed completely onto the device 1, if desired.

The relatively low profile, enabling loading while avoiding excessive lifting, is facilitated by the relatively simple straight-forward construction of an arrangement according to the present invention. In particular, motion is achieved through the utilization of foot members which may, if desired, have a relatively low profile or relief.

It will be understood that motive mechanisms according to the present invention may be utilized in a variety of embodiments. Further, in many instances more than one mode of operation is available, for example compare the operation of the arrangement shown in FIGS. 1-7, with the operation of FIG. 11. It is understandable that the device 1 has simply been turned over, to accommodate shifting between the two modes.

Figure 9:
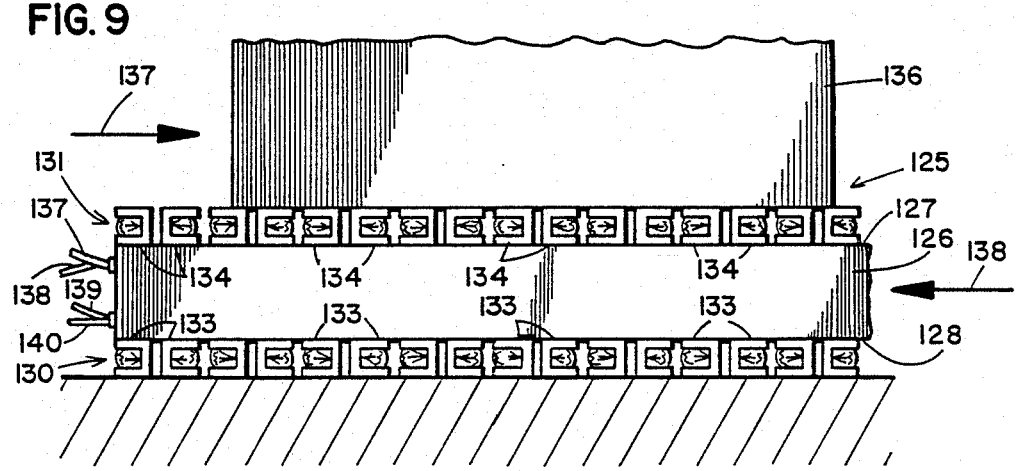
FIG. 9 is an enlarged fragmentary side elevational view of a device according to a first alternate embodiment of the present invention.

An alternate embodiment of the present invention is depicted in FIG. 9. More specifically, in FIG. 9 a system or device 125 is depicted comprising a substrate 126 oriented to have more than one mounting surface comprising a first surface 127 and a second surface 128. A motive mechanism 130 is shown associated with the second surface 128, and another motive mechanism 131 is shown associated with the first substrate surface 126.

Motive mechanism 130 comprises pairs 133 of foot members, generally analogous to pairs 14 described in FIG. 2. The upwardly directed motive mechanism 131 generally comprises pairs 134 of foot members, generally analogous to those 14 of FIG. 2, but directed upwardly. Via such an arrangement, cargo 137 can be moved independently of substrate 126.

More specifically, as an example, cargo 136 can be moved in the direction of arrow 137, by selective operation of pairs 134 of foot members. On the other hand, substrate 126 can be moved simultaneously in the direction of arrow 138, by selective operation of pairs of foot members 133. Such an overall operation would readily permit substrate 126 to be moved out from underneath cargo 136. Alternatively, the device could be caused to crawl underneath a large item of cargo, once a first edge of the cargo has been placed on the device.

While for the arrangement shown in FIG. 9 motive mechanisms 130 and 131 are selectively operable to move either the substrate 126 or the cargo 137 generally along similar or parallel directions, there is no requirement that such must be the case. That is, the upper motive mechanism 131 can be oriented such that cargo 136 moved thereby moves along a path at an angle to path of movement of substrate 126, selectively generated by pairs 133.

In FIG. 9 fluid communication with individual members of the pairs 134 is provided by means of four conduits and/or lines 137 and 138, which communicate with conduits, not shown, in substrate 126. Similarly, fluid flow communication with individual members of pairs 133 is provided by conduits 139 and 140. The nature of fluid communication for a preferred embodiment will be understood by reference to the discussion below of FIG. 8.

Figure 10:
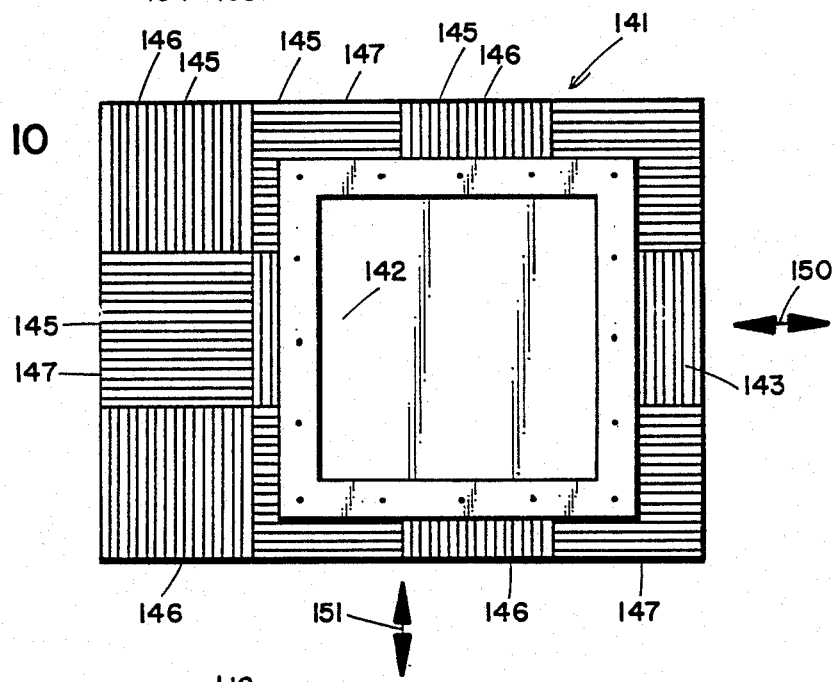
FIG. 10 is a top elevational view of a system according to a second alternate embodiment of the present invention.

Yet another embodiment of the present invention is illustrated in FIG. 10. In FIG. 10, an overall arrangement 141 is depicted having cargo 142 mounted thereon. Arrangement 141 has an upper surface 143, upon which cargo 142 rests. Arrangement 141 comprises a plurality of devices 145, oriented such that selective movement in a variety of directions is possible. In particular, for the preferred arrangement of FIG. 10, devices 145 is divided into a first set 146 and a second set 147. Set 146 is generally aligned to cause movement of cargo 142, as selected, along the general directions indicated by double-headed arrow 150. Set 147, on the other hand, is generally oriented to cause movement of cargo 142 along the directions indicated by double-headed arrows 151. It will be understood that each device 145 may comprise an arrangement having upwardly directed foot portions, which may engage the cargo 142 and selectively move same in a general manner analogous to that previously described.

Generally, selective operation of sets 146 and 147 can be used to mvoe the cargo 142 toward any selected lateral direction. Movement at an angle can be accomplished by selected operation of sets 146 and 147. For example, one of sets 146 and 147 may be kept idle, while the other is operated, and vice versa.

It will be understood that generally for the preferred embodiment of FIG. 10, devices 145, comprising sets 146 and 147, are oriented in a generally checkerboard shaped fashion, with the devices operable at about 90° with respect to one another. Other arrangements may be utilized. Preferably each square or section of device 145 is sufficiently small so that the cargo 142 extends over more than one of such sections 145 at a time. However, such is not generally required, because if appropriate actuation means are provided, the devices 145 can be selectively operated to move the cargo 142 in almost any direction as desired.

A variety of actuation mechanism arrangements, not shown, may be utilized to operate devices 145. If the devices 145 are independently actuatable, an arrangement such as that shown in FIG. 10 might be used to create an aisle in a storeroom of closely packed crates. On the other hand, for some arranged it may be preferred to provide for simultaneous actuation of all units 146, but independently of simultaneous actuation of all units 147.

Figure 8:
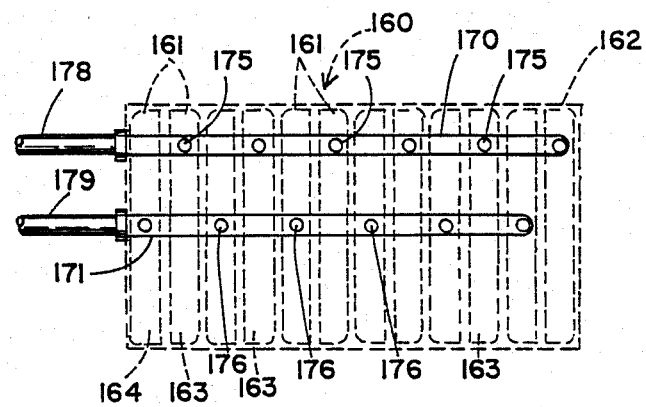
FIG. 8 is a schematic representation of fluid conduit means for operation of an apparatus or device as depicted in FIGS. 1-7.

A variety of methods of providing fluid flow communication with the bladder means or mechanism of each foot or hinge member can be utilized. A preferred such arrangement is illustrated in FIG. 8. Referring to FIG.

8, a device 160 is depicted, schematically, comprising a plurality of pairs 161 of foot members, mounted on a substrate 162. Each pair 161 comprises a first hinged member 163 and a second hinged member 164. All hinged members 163 are oriented, for example, as front hinged members, and all hinged members 164 are oriented, for example, as rear hinged members. Fluid communication with the hinged members 163 and 164 is provided by means of conduits 170 and 171. Fluid conduits 170 and 171 extend generally partially and longitudinally through substrate 162. For the arrangement shown in FIG. 8, fluid conduit 170 is in flow communication with bladder members of hinged members 163, by means of apertures 175. Similarly, fluid conduit 171 is in flow communication with bladder members of hinged members 164, by means of apertures 176. Conduits 170 and 171 are operated by means of fluid passing through exterior lines 178 and 178 respectively.

It will be readily understood that as fluid is introduced in through line 178 and conduit 170, the bladders of members 173 are selectively expanded. Further, when fluid is withdrawn from line 178, the bladders of members 163 are contracted. Similarly, the bladders of members 164 are operated by means of fluid passage through line 179 and conduit 171. Fluid flow control can be maintained by any of a variety of arrangements, one example being schematically represented in FIG. 1, and described below. Again, it will be understood that FIG. 8 is generally schematic only, and merely represents one general arrangement for providing fluid flow communication, selectively and independently, between different members of each pair of foot members.

Referring to FIG. 1, control unit or mechanism 6 comprises a pair of tanks 185 and 186 operable by a control system 187. The tanks 185 and 186 contain fluid, under pressure, for communication with device 1 through fluid lines, such as lines 178 and 179. It will be understood that a single reservoir, rather than two tanks 185 and 186, could be utilized, if an appropriate valving system was provided. Generally, control unit 187 may include a compressor, for charging of tanks 185 and 186, as well as various valve means, timers and similar control devices to provide for appropriate fluid pressure control. Such devices may be conventional, and are not described herein in detail. For withdrawal of fluid, internal pressure and pressure from weight of the system and cargo may in some instances be used to facilitate desired bladder member collapse. Means associated with the control mechanism to provide a slight negative pressure, in order to draw fluid out from the bladders, may be used. Devices for causing fluid suction are well-known. Also, stretchable, or elastic, material for the bladder members can be used to facilitate bladder collapse.

A variety of shapes of foot members may be utilized in devices according to the present invention. For the embodiments depicted in FIGS. 1-11, a single block letter C shape was shown. Such a shape is of relatively low profile, and fairly easy to manufacture due to its constant shape. However, with respect to lateral motion such a shape is less efficient than is readily achievable, due to the fact that the substrate or cargo must be lifted a considerable amount in order to obtain substantial lateral movement; lateral movement rather than vertical lift being the more desired component of motion.

Figure 13:
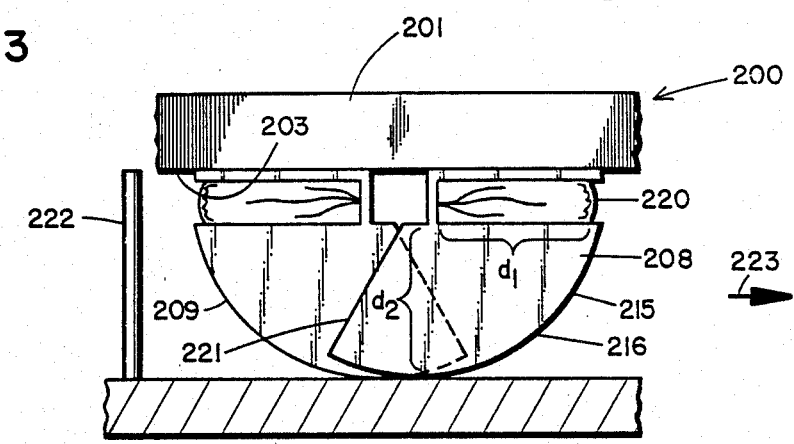
FIG. 13 is an enlarged fragmentary side elevational view of the embodiment depicted in FIG. 12, shown during a step of operation comprising a rest position.
Figure 14:
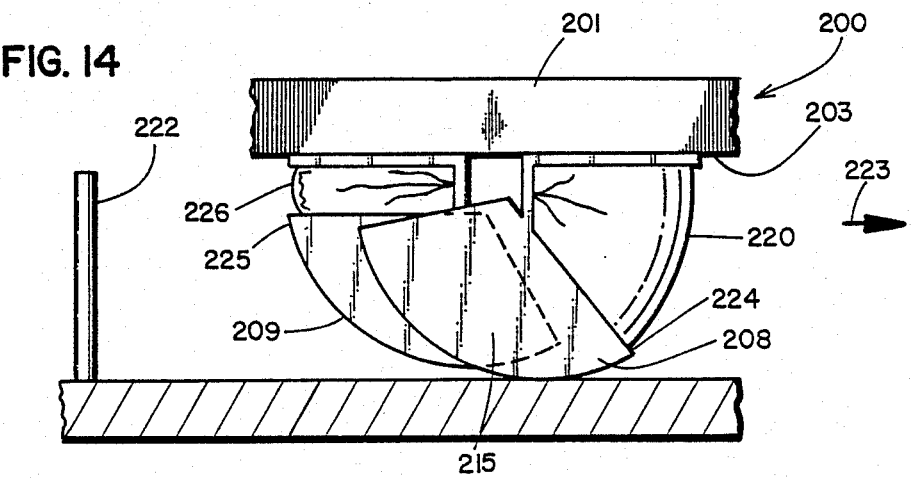
FIG. 14 is an enlarged fragmentary side elevational view of a device generally analogous to that shown in FIG. 13, but depicted with one foot portion expanded to generate both vertical and lateral movement.

For alternate embodiments it is possible to shape the foot members in such a manner so as to generate a higher degree of lateral motion, relative to vertical motion, during bladder expansion. While a variety of designs may be utilized to accomplish this, a preferred such design is illustrated in FIGS. 12-14.

Figure 12:
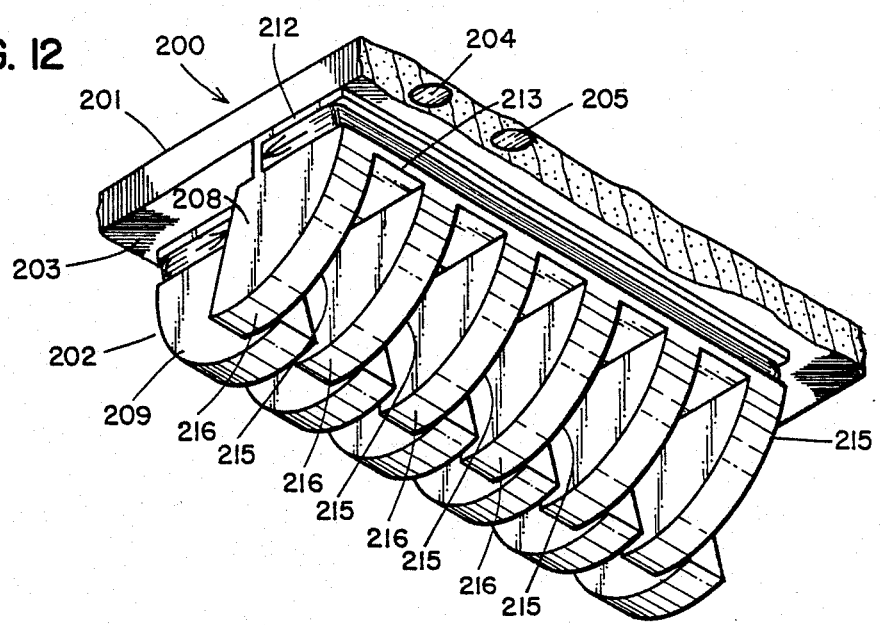
FIG. 12 is an enlarged fragmentary bottom perspective view of a device according to a third alternate embodiment of the present invention.

FIG. 12 is a fragmentary perspective view of a device 200 according to the present invention. The device 200 of FIG. 12 corresponds to an arrangement having a substrate 201 with a motive mechanism comprising pairs of foot members 202 mounted on one side thereof. It will be understood, however, that foot members or foot portions according to the alternate embodiments of FIGS. 12-14 may be utilized in a variety of systems, including ones such as is shown in FIGS. 9 and 10.

It is noted that in FIG. 12 only one pair 202 of foot members is depicted, due to the fragmentary view. Further, substrate 201 is depicted with the pair of foot members 202 mounted on an underside 203 thereof. Alternatives are, of course, possible. Conduits 204 and 205, for providing fluid communication with the appropriate bladders, are also viewable in FIG. 12.

The pair of foot members 202 comprises a first hinged member 208 and a second hinged member 209. For the preferred embodiment of the arrangement depicted in FIGS. 12-14, hinged members 208 and 209 are substantially mirror images of one another, but mounted in an interlocking fashion as described and shown.

Referring again to FIG. 12, hinged member 208 includes an upper extension 212, by which it is mounted to the mounting surface or underside 203 of substrate 201. Extension 212 may be substantially identical to that utilized for the foot members of the previously described embodiments, FIGS. 1-11.

Hingedly attached to extension 212 is a lower extension 213. The lower extension comprises a plurality of spaced extensions or pads 215. EAch extension or pad 215 includes a surface 216 oriented to engage a warehouse floor (or portion of cargo if used in an alternate mode) during use. Surfaces 216 provide ramps which generate a more preferred ratio of lateral movement to upward lift, as described below.

Referring to FIG. 13, it will be understood that if bladder 220 is expanded, hinged member 208 will roll along surface 216. Vertical lift will result if distance $d_1$ is greater than distance $d_2$. Significantly, a considerable amount of lateral motion can be generated during relatively little lift, through operation with an appropriately curved surface 216. While a variety of shapes of pads 215 might be utilized, for a preferred embodiment $d_2$ is about 4/5 of $d_1$ and curved surface 216 is regular. It is noted that member 215 includes a heel extension or portion 221 facilitating stability. Distances $d_1$ and $d_2$ will be understood to generally represent a radius of curvature of portions of surface 216 with respect to a hinge line for hinged member 208.

Operation of the embodiment of FIG. 12 will be understood by comparison of FIGS. 13 and 14. In FIGS. 13 and 14, post 222 provides for a reference to help evaluation of both vertical and lateral movement. For the Figs., forward motion will be understood to be motion in the direction of arrows 223, and rearward motion the opposite. It will be understood, however, that the terms of direction are used for purposes of clarification only, and are not to be limiting.

Comparing FIGS. 13 and 14, as bladder 220 is expanded, member 208 pivots about a virtual hinge line and is rolled upwardly along surface 216 toward toe-edge 224 and away from head edge 225, moving substrate 201 a substantial distance laterally and in a forward direction indicated in FIGS. 13 or 14. The action also lifts the substrate 201 slightly, resulting in a lift of the rear hinged member 209. When bladder 226 is expanded, it will be understood that substrate 201 will be supported by both the front hinged member 208 and the rear hinged member 209. Under such circumstances, the front hinged member 209 can be collapsed, along with bladder 220. Then a lowering of rear hinged member 209, through collapse of rear bladder 226, would further move the substrate 201 forwardly, while at the same time lowering same. Thus, action is similar to that previously described for FIGS. 3-7, except for the actual shape of a side member of the hinged members. It will be understood, by reference to FIG. 12, that the heel portions of the first and second hinged members 208 and 209 may be aligned staggered, so that overlap is possible.

Comparison of FIGS. 13 and 14, and a careful assessment of the nature of geometry involved in curved surface 216, will make it readily understood that the modification from the embodiment of FIGS. 1-11 to the embodiment of FIGS. 12-14 leads to an efficient usage of fluid pressure in obtaining lateral movement. That is, relatively little lift occurs but substantial smooth lateral movement occurs. This not only attains an efficient motion, but also a bit smoother operation for the cargo.

It is envisioned that a variety of materials can be utilized to form the components of the system. In some instances, each foot member, or each pair of foot members, amy be molded as a single unit and cut to appropriate lengths and sealed. In others, the bladder may be provided as a separate component. Further, in some instances the bladder may comprise a self-contained, elongate, tube positioned appropriately within the hinge sides of each foot member. In still others, the bladder may simply comprise a flexible seal along the open edges of each hinge member or foot member. It may be preferred to mount each foot member, or at least each pair of foot members, independently of one another so that they may be readily replaced as necessary.

From the above descriptions it will be understood that a relatively simple but convenient and efficient method of handling cargo is described. Further, the system or assembly can be created for relatively little expense, as only a few components are needed and all foot members may be substantially identical, if desired. A variety of modes of operation have been presented, indicating almost universal use. further, the components would be expected to operate without substantial difficulty under a variety of conditions, including great variations in temperatures, weather, an under a variety of loads. Also, the devices can be operated on up grades, down grades, over the tops of hills, and through valleys. Generally, problems frequently encountered in conventional mechanical systems, especially those involving metal parts or bearing systems, are avoided. Further, relatively low energy may be utilized and the energy may be such as is readily provided by a portable source, such as a portable compressor or the like. Thus, the device may be utilized even at remote locations to facilitate material or equipment handling.

Another mode of the invention may be to mount the device or least a motive mechanism directly on an object to be moved. For example, devices according to the present invention might be mounted on the underside of a major piece of equipment or the like to be moved.

From the above descriptions, various advantageous uses of the invention can be readily understood. For example, the components can be made from materials readily operable whether wet or dry, and under a variety of environmental conditions. Thus, for example, in an embodiment having foot or hinged members directed upwardly, devices according to the present invention might be utilized as a boat ramp or float plane ramp, to move a boat or plane into and out of water. Further, the system might be utilized to handle cargo in the cargo hold of a ship, with the cargo being very tightly packed. A particular advantage to such arrangements is that appropriate actuation is provided so that foot members can be operated to selectively cause passageways to appear between large cartons of cargo, especially if a system comprising selectively and independently operable sections of devices are used.

Further, a large section of the device can be created to crawl completely into or outwardly from a truck bed or the like, or to move a stack of crates as a single operation. Thus, an entire truck can be loaded or unloaded by a single operation, lessening the loading time. Movement of substrates under such conditions may be facilitated by guide rails or the like oriented on a loading dock, or along sides of the truck, to keep the substrate moving in a straight direction, even if not evenly loaded with the cargo.

In still other embodiments, the substrate could be made from a material which is readily rolled up, so that a conveyor path could simply be unrolled along a portion of floor over which cargo is to be transported. In some systems, short strips of sections could be aligned in a manner permitting movement of cargo around turns or the like.

In some arrangements, for example arrangements having motive mechanisms directed upwardly, selected adjacent pairs of foot members might be oriented at a slight angle to one another, to cause movement along a curved path. Similarly, if downwardly directed motive mechanism were oriented in a curved fashion, utilizable modifications might be generated. For example a doughnut shaped section of substrate could be caused to move in a circle. Such a system might be utilizable for storage of heavy cargo thereon in a warehouse or the like, whereby the substrate could be rotated to permit access to any selected portion of cargo from a loading-/unloading station.

Another advantageous feature to systems according to the present invention, is that they maybe made readily portable and operable under low power conditions. Thus, for example, they may be utilized in the field with control by an air compressor or the like, to provide for convenient conveyor systems at remote construction sites or the like.

From the above suggestions, and the detailed descriptions, it will be understood that systems according to the present invention are highly flexible, and maybe utilized in a variety of systems and in a variety of embodiments. It is to be understood that while certain embodiments of the present invention have been illustrated and described, the invention is not to be limited to the specific forms or arrangement or parts herein described and shown.

What is claimed and desired to be secured by Letters Patent is as follows:

1. A device for transporting cargo or the like; said device comprising:
   (a) a substrate having at least one mounting surface;
   (b) a motive mechanism including a plurality of pairs of foot members mounted on said substrate mounting surface; each pair of foot members including first and second hinged members to form a first set of hinged members and a second set of hinged members;

(i) each hinged member having first and second side members; each hinged member first side member being mounted on said substrate mounting surface;

(ii) each hinged member second side member having an outer toe-edge and an inner heel portion; said first and second side members being hingedly mounted with respect to one another for movement between opened and collapsed positions; said opened position having said second side member toe-edge pivoted to a position located further away from said first side member of the same hinged member, relative to said closed position; and, said second side member heel portion pivoting but not moving further from said first side member throughout movement of said second side member from said collapsed position to said open position;

(iii) each hinged member including fluid bladder means constructed and arranged for generating selected hinged biasing of said second side members, relative to said first side members, between said opened and collapsed positions, upon expansion and contraction, respectively, of said bladder means; and, (c) a control mechanism constructed and arranged for independent and selective activation of fluid bladder means of said first set of hinged members relative to fluid bladder means of said second set of hinged members;

(d) whereby cargo can be selectively transported in forward and rearward directions.

2. A device according to claim 1 wherein:
(a) said fluid bladder means comprises a plurality of elongate tubular bladder members one each of which is positioned between said first and second side members of each hinged member.

3. A device according to claim 2 wherein:
(a) said control mechanism includes first and second independent fluid conduits extending through said substrate; said first fluid conduit being in fluid flow communication with each tubular member in each first hinged member; and, said second fluid conduit being in fluid flow communication with each tubular member in each second hinged member; and,
(b) said control mechanism includes means for selectively and independently directing fluid into first hinged member bladder members via said first conduit, and withdrawing fluid therefrom; and, said control mechanism includes means for selectively and independently directing fluid into second hinged member bladder members via said second conduit, and withdrawing fluid therefrom.

4. A device according to claim 1 wherein:
(a) each hinged member second side member comprises an elongate strip having a generally flat outer surface on a side of said hinged member oriented away from a first side member of the same hinged member.

5. A device according to claim 1 wherein:
(a) each hinged member second side member has an outer surface with a curved ramp; each curved ramp being oriented for pivoting about a selected virtual hinge line; a radius of curvature of said curved ramp, relative to said virtual hinge line, generally increasing as said toe-edge is approached.

6. A device according to claim 5 wherein:
(a) each hinged member second side member outer surface includes a plurality of curved ramps thereon, each having a heel portion; said second side members of each pair of foot members being oriented with said plurality of curved ramps oriented in an intermeshing pattern of alternating forwardly and rearwardly directed curved ramps.

7. A device for transporting cargo or the like; said device comprising:
(a) a substrate having at least one mounting surface;
(b) a motive mechanism including a plurality of pairs of foot members mounted on each substrate mounting surface; said pairs of foot members on a first substrate mounting surface comprising a first set of pairs of foot members; and, said pairs of foot members mounted on a second substrate mounting surface comprising a second set of pairs of foot members;

(i) each pair of foot members of said first set including first and second oppositely directed hinged members forming a first set of hinged members and a second set of hinged members respectively;

(ii) each pair of foot members of said second set including first and second oppositely directed higned members forming a third set of hinged member and a fourth set of hinged members respectively;

(iii) each hinged member having first and second side members hingedly mounted with respect to one another; each hinged member first side member being mounted on an associated substrate mounting surface;

(iv) each hinged member including fluid bladder means constructed and arranged for generating selected hinged biasing of said second side members, relative to said first side members, between opened and collapsed positions upon expansion and constraction, respectively, of said bladder means; and, (c) a control mechanism constructed and arranged for:
(i) independent and selective activation of fluid bladder means of said first set of hinged members relative to said fluid bladder means of said second set of hinged members; and
(ii) independent and selective activation of fluid bladder means of said third set of hinged members relative to said bladder means of said fourth set of hinged members;

(d) whereby said substrate can be selectively transported in first and second, opposite, directions by said first set of pairs of foot members; and,
(e) whereby cargo on said substrate can be selectively transported in third and fourth, opposite, directions by said second set of pairs of foot members.

8. A device according to claim 7 wherein:
(a) said first and second sets of pairs of foot members are oriented so that said first and second, opposite, directions are substantially parallel to said third and fourth, opposite, directions.

9. A device according to claim 7 wherein:
(a) said first and second pairs of foot members are oriented so that said first and second, opposite, directions are substantially at right angles to said third and fourth, opposite, directions.

10. A device according to claim 7 wherein:
(a) said fluid bladder means a plurality of elongate tubular bladder members one each of which is positioned between said first and second side members of each hinged member.

11. A method according to claim 10 wherein:
(a) said control mechanism which includes first, second, third and fourth independent fluid conduits extending substantially longitudinally through said substrate; said first fluid conduit being in fluid flow communication with each tubular member in each of said first set of hinged members; said second fluid conduit being in fluid flow communication with each tubular member in each of said second set of hinged members; said third fluid conduit being in fluid flow communication with each tubular member in each of said third set of hinged members; and, said fourth fluid conduit being in fluid flow communication with each tubular member in each of said fourth set of hinged members; and
(b) said control mechanism includes means for selectively and independently directing fluid into, and withdrawing fluid from, each of said first, second, third and fourth sets of hinged members via said first, second, third and fourth conduits respectively.

12. A device according to claim 11 wherein:
(a) each hinged member second side member comprises an elongate strip having a generally flat outer surface and a toe edge.

13. A device according to claim 11 wherein:
(a) each hinged member second side member has a pad with an outer surface having a toe edge, a heel edge, and a curved ramp extending therebetween; each curved ramp being oriented for pivoting about a selected hinge line, a radius of curvature of said curved ramp, relative to said virtual hinge line, generally increasing as said toe edge is approached.

14. A method of transporting cargo or the like said method including the steps of:
(a) providing a substrate having upper and lower surfaces with cargo on said substrate upper surface;
(b) providing a motive mechanism including a plurality of pairs of foot members mounted on said substrate lower surfaces, each pair of foot members including first and second hinged members forming first and second sets of oppositely directed hinged members;
(i) each hinged member having first and second side members; each hinged member first side member being mounted on said substrate mounting surface;
(ii) each hinged member second side member having an outer toe-edge and an inner heel portion; said first and second side members being hingedly mounted with respect to one another for movement between opened and collapsed positions; said opened position having said second side member toe-edge pivoted to a position located further away from said first side member of the same hinged member, relative to said closed position; and, said second side member heel portion pivoting but not moving further from said first side member throughout movement of said second side member from said collapsed position to said open position;
(iii) each hinged member including fluid bladder means constructed and arranged for generating selected hinged biasing of said second side members, relative to said first side members, between said opened and collapsed positions upon expansion and contractions, respectively, of said bladder means; and,
(c) providing a control mechanism constructed and arranged for independent and selective activation of fluid bladder means of said first set of hinged members relative to fluid bladder means of said second set of hinged members;
(d) actuating said first set of hinged members by expansion of said fluid bladder means in association therewith;
(e) following step (d), actuating said second set of hinged members by expansion of said fluid bladder means in association therewith;
(f) following step (e), actuating said first set of hinged members by collapse of said fluid bladder means in association therewith;
(g) following step (f), actuating said second set of hinged members by collapse of said fluid bladder means in association therewith; and,
(h) repeating steps (d) through (g) until a desired movement of cargo and substrate is achieved.

15. A method according to claim 14 including:
(a) providing as said fluid bladder means a plurality of elongate tubular bladder members one each of which is positioned between said first and second side members of each hinged member.

16. A method according to claim 15 including:
(a) providing a control mechanism which includes first and second independent fluid conduits extending through said substrate; said first fluid conduit being in fluid flow communication with each tubular member in each first hinged member; and, said second fluid conduit being in fluid flow communication with each tubular member in each second hinged member; and,
(b) providing a control mechanism which includes means for selectively and independently directing fluid into first hinged member bladder members via said first conduit, and withdrawing fluid therefrom; and, said control mechanism includes means for selectively and independently directed fluid into second hinged member bladder members via said second conduit, and withdrawing fluid therefrom.

17. A method of transporting cargo or the like; said method including the steps of:
(a) providing a substrate having an upper mounting surface;
(b) providing a motive mechanism comprising a plurality of pairs of footmembers mounted on said substrate upper surface; each pair of foot members including first and second hinged members and forming first and second sets of oppositely directed hinged members;
(i) each hinged member having first and second side members; each hinged member first side member being mounted on said substrate mounting surface;
(ii) each hinged member second side member having an outer toe-edge and an inner heel portion; said first and second side members being hingedly mounted with respect to one another for movement between opened and collapsed positions; said opened position having said second side member toe-edge pivoted to a position located further away from said first side member of the same hinged member, relative to said closed position; and, said second side member heel portion pivoting but not moving further from said first side member throughout movement of said second side member from said collapsed position to said opened position;

(iii) each hinged member including fluid bladder means constructed and arranged for generating selected hinged biasing of said second side members, relative to said first side members, between said opened and collapsed positions, upon expansion and contraction, respectively, of said bladder means; and, (c) providing a control mechanism constructed an arranged for independent and selective activation of fluid bladder means of said first set of hinged members relative to fluid bladder means of said second set of hinged members;

(d) placing cargo on said motive mechanism;

(e) actuating said first set of hinged members by expansion of said fluid bladder means in association therewith;

(f) following step (e), actuating said second set of hinged members by expansion of said fluid bladder means in association therewith;

(g) following step (f), actuating said first set of hinged members by collapse of said fluid bladder means in association therewith;

(h) following step (g), actuating said second set of hinged members by collapse of said fluid bladder means in association therewith; and, (i) repeating steps (e) through (h) until a desired movement of cargo is achieved.

18. A method according to claim 17 including:

(a) providing as said fluid bladder means a plurality of elongate tubular bladder members one each of which is positioned between said first and second side members of each hinged member.

19. A method according to claim 18 including:

(a) providing a control mechanism which includes first and second independent fluid conduits extending through said substrate; said frist fluid conduit being in fluid flow communication with each tubular member in each first hinged member; and, said second fluid conduit being in fluid flow communication with each tubular member in each second hinged member; and, (b) providing a control mechanism which includes means for selectively and independently directing fluid into first hinged member bladder members via said first conduit, and withdrawing fluid therefrom; and, said control mechanism includes means for selectively and independently directed fluid into second hinged member bladder members via said second conduit, and withdrawing fluid therefrom.

* * * * *